US011354141B2

(12) United States Patent
Cohen et al.

(10) Patent No.: US 11,354,141 B2
(45) Date of Patent: Jun. 7, 2022

(54) USER INTERFACE OPTIMIZATION FOR DELAYED DATA (71) Applicant: HITACHI VANTARA LLC, Santa Clara, CA (US)

(72) Inventors: Jared Cohen, Santa Clara, CA (US); Jordan Diehl, Santa Clara, CA (US); Frank Fodera, Santa Clara, CA (US); Yury Kats, Santa Clara, CA (US)

(73) Assignee: HITACHI VANTARA LLC, Santa Clara, CA (US)

( * ) Notice: Subject to any disclaimer, the term of this patent is extended or adjusted under 35 U.S.C. 154(b) by 0 days.

(21) Appl. No.: 16/963,290

(22) PCT Filed: Apr. 12, 2018

(86) PCT No.: PCT/US2018/027227
§ 371 (c)(1),
(2) Date: Jul. 20, 2020

(87) PCT Pub. No.: WO2019/199308
PCT Pub. Date: Oct. 17, 2019

(65) Prior Publication Data
US 2020/0364065 A1 Nov. 19, 2020

(51) Int. Cl.
G06F 3/048 (2013.01)
G06F 9/451 (2018.01)
(Continued)

(52) U.S. Cl.
CPC ............ G06F 9/451 (2018.02); G06F 11/302 (2013.01); G06F 11/328 (2013.01);
(Continued)

(58) Field of Classification Search
CPC .............. G06T 11/206; G06T 2200/24; G06F 11/3419; G06F 16/901; G06F 16/22;
(Continued)

(56) References Cited

U.S. PATENT DOCUMENTS

2013/0159512 A1 6/2013 Groves et al.
2015/0244735 A1 8/2015 Kumar et al.
(Continued)

OTHER PUBLICATIONS

International Search Report and Written Opinion of PCT/US2018/027227 dated Jun. 28, 2018.
(Continued)

Primary Examiner — Aleksey Olshannikov
(74) Attorney, Agent, or Firm — Mattingly & Malur, PC (57) ABSTRACT In some examples, a computer system may receive an indication to present a user interface presenting data for a plurality of metrics related to at least one of a status or a performance of a storage system. The computer system may determine a status of a workflow that processes messages received from the storage system. Further, the computer system may determine an end time for a plurality of metric visualizations to present in the user interface based on the status of the workflow. The computer system may render the plurality of metric visualizations, with each metric visualization having the determined end time. Further, the computer system may provide the plurality of rendered metric visualizations for presentation in the user interface on a display.

19 Claims, 6 Drawing Sheets (51) Int. Cl.
　　　*G06F 11/30*　　　(2006.01)
　　　*G06F 11/32*　　　(2006.01)
　　　*G06F 11/34*　　　(2006.01)
　　　*G06T 11/20*　　　(2006.01)

(52) U.S. Cl.
　　　CPC ........ *G06F 11/3419* (2013.01); *G06T 11/206* (2013.01); *G06T 2200/24* (2013.01)

(58) Field of Classification Search
　　　CPC ...... G06F 9/451; G06F 11/302; G06F 11/328; G06F 11/3034; G06F 11/324; G06F 11/3409
　　　See application file for complete search history.

(56)　　　　　References Cited

U.S. PATENT DOCUMENTS

| | | |
|---|---|---|
| 2016/0099844 A1 | 4/2016 | Colgrove et al. |
| 2016/0197802 A1 | 7/2016 | Schultz et al. |
| 2016/0307173 A1 | 10/2016 | Chauhan et al. |
| 2018/0084024 A1* | 3/2018 | Xie ...................... H04L 65/602 |

OTHER PUBLICATIONS

Japanese Office Action received in corresponding Japanese Application No. 2020-547360 dated Aug. 31, 2021.

Extended European Search Report received in corresponding European Application No. 18914097.3 dated Nov. 3, 2021.

* cited by examiner

USER INTERFACE OPTIMIZATION FOR DELAYED DATA

TECHNICAL FIELD

This disclosure relates to the technical field of controlling user interfaces and associated data.

BACKGROUND

A user interface (UI) for monitoring computer systems may receive data from various sources through various push and/or pull techniques for presentation to a user in the UI. If underpowered hardware is included in the system or there is some other issue that causes a delay in data processing, some portions of the data presented in the UI may fall behind other portions of the data. This can result in the UI presenting some current data while other data may be updated or may be missing as the user interface is presented. This can lead to continual re-rendering of the UI and the included visualizations. Re-rendering of the UI may cause flickering of portions of the UI or the entire UI as the re-rendering takes place, which may provide a poor user experience. Further, continual re-rendering of the UI may be computationally expensive, which may degrade the performance of the computing device that presents the UI.

SUMMARY

Some implementations include a computer system that may receive an indication to present a user interface that displays data including a plurality of metrics related to at least one of a status or a performance of a storage system. The computer system may determine a status of a workflow that processes messages received from the storage system. Further, the computer system may determine an end time for a plurality of metric visualizations to present in the user interface based on the status of the workflow. The computer system may render the plurality of metric visualizations, with each metric visualization having the determined end time. Further, the computer system may provide the plurality of rendered metric visualizations for presentation in the user interface on a display.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DESCRIPTION OF THE EMBODIMENTS

Some implementations herein are directed to techniques and arrangements for generating a user interface (UI) in a computer system having a configuration that may delay availability of some data for the UI. As one example, a monitoring application may determine whether one or more workflows are up-to-date or otherwise current. If the monitoring application determines that a workflow is not current, then the monitoring application may redefine the timeframe for a plurality of metric visualizations to be presented in the UI by defining an end time for each metric to be the most recent real point of data received for the workflow. In some cases, a first timestamp (a) may correspond to the most recently queued workflow input item to enter a workflow queue. Further, a second timestamp (t2) may correspond to a most recently completed workflow item that has been completed by the workflow.

When t1 and t2 are determined to be the same, then this determination indicates that the workflow is current and the end time used may be based on the current time or other timing considerations. On the other hand, if t1 and t2 are determined to differ, then this determination may indicate a backlog in the data processing workflow. When the monitoring application determines that the data processing workflow is backlogged, the monitoring application may set the metrics in the UI to use t2 as the end time of all displayed metric visualizations in the UI. Accordingly, all of the metric visualizations may be set to the same end time so that the metric visualizations are synchronized in time even though the data received for some of the metrics is ahead of the data received for others of the metrics. As time progresses, the monitoring application may determine a next end time (e.g., a new t2 or if the workflow catches up, the current time) by again retrieving and comparing t1 and t2 at a later point in time.

Some examples include a monitoring application that configures a monitoring computing device to monitor performance of a computer system including a storage system in near-real-time (NRT). The monitoring application may provide a plurality of visualizations of a plurality of metrics related to the performance of the computer system. The plurality of visualizations may be presented together in one or more monitoring UIs (which may also be referred to as dashboards in some examples) to provide a visual indication to a user of the current status and performance of the system. The monitoring application may also trigger alerts or other notifications to the user based on defined values or other thresholds that may be set for each of the metrics determined by the monitoring application.

Implementations herein include a process to set a plurality of visualization windows for synchronizing the plurality of visualizations within a UI. As time progresses, the monitoring application may determine new "current" times which may or may not match the actual time, and may determine any metric data updates between the last time used for generating the visualizations and the new visualization time. Accordingly, the examples herein provide for a reduction in the computational load of re-generating the entire visualization when one or more of the UI metric visualizations fall behind and subsequently catch up.

For discussion purposes, some example implementations are described in the environment of one or more monitoring computing devices that monitor performance of one or more network storage systems that interact with one or more service computing devices and plurality of client devices for managing data storage. However, implementations herein are not limited to the particular examples provided, and may be extended to other types of computing system architectures, other types of storage environments, other types of client and server configurations, other types of data, and so forth, as will be apparent to those of skill in the art in light of the disclosure herein.

Figure 1:
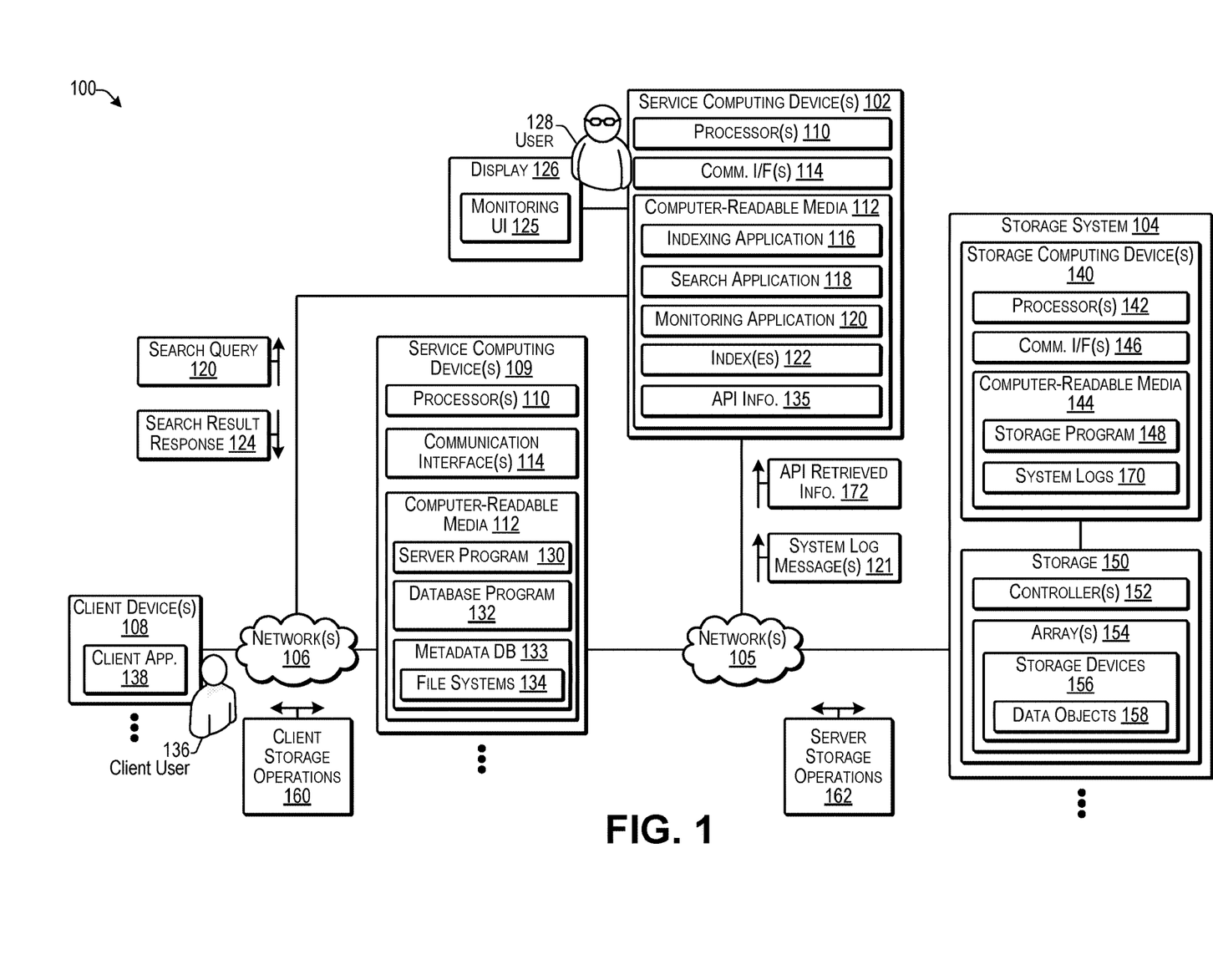
FIG. 1 illustrates an example architecture of a system according to some implementations.

FIG. 1 illustrates an example architecture of a system 100 configured for presenting a UI according to some implementations. In some cases, the system 100 may correspond to a cluster of a plurality of computing devices; however, implementations herein are not limited to any particular system configuration. The system 100 includes a least one service computing device 102, also referred to herein as a node that is able to communicate with, or is otherwise coupled to, a storage system 104, such as through one or more networks 105. Further, the service computing device 102 may be able to communicate over one or more networks 106 with one or more client computing devices 108, which may be any of various types of computing devices, as discussed additionally below. In addition, the client computing device(s) 108 may be able to communicate with one or more service computing devices 109 such as for accessing the storage system 104 via the service computing device(s) 109. Accordingly, the service computing device(s) 109 may also be node(s) in the system 100.

In some examples, the service computing devices 102 and 109 may include one or more servers or other types of computing devices that may be embodied in any number of ways. For instance, in the case of a server, the programs, applications, other functional components, and at least a portion of data storage may be implemented on at least one server, such as in a cluster of servers, a server farm, a data center, a cloud-hosted computing service, and so forth, although other computer architectures may additionally or alternatively be used. In the illustrated example, the service computing devices 102 and 109 may each include, or may have associated therewith, one or more processors 110, one or more computer-readable media 112, and one or more communication interfaces 114.

Each processor 110 may be a single processing unit or a number of processing units, and may include single or multiple computing units, or multiple processing cores. The processor(s) 110 can be implemented as one or more central processing units, microprocessors, microcomputers, microcontrollers, digital signal processors, state machines, logic circuitries, and/or any devices that manipulate signals based on operational instructions. As one example, the processor(s) 110 may include one or more hardware processors and/or logic circuits of any suitable type specifically programmed or configured to execute the algorithms and processes described herein. The processor(s) 110 may be configured to fetch and execute computer-readable instructions stored in the computer-readable media 112, which may program the processor(s) 110 to perform the functions described herein.

The computer-readable media 112 may include volatile and nonvolatile memory and/or removable and non-removable media implemented in any type of technology for storage of information, such as computer-readable instructions, data structures, application program modules, or other data. For example, the computer-readable media 112 may include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the service computing devices 102 and 109, the computer-readable media 112 may be a tangible non-transitory medium to the extent that, when mentioned, non-transitory computer-readable media exclude media such as energy, carrier signals, electromagnetic waves, and/or signals per se. In some cases, the computer-readable media 112 may be at the same location as the service computing devices 102 and 109, while in other examples, the computer-readable media 112 may be partially remote from the service computing devices 102 and 109. For instance, in some cases, the computer-readable media 112 may include a portion of storage in the storage system 104.

The computer-readable media 112 may be used to store any number of functional components that are executable by the processor(s) 110. In many implementations, these functional components comprise instructions or programs that are executable by the processor(s) 110 and that, when executed, specifically program the processor(s) 110 to perform the actions attributed herein to the service computing devices 102 and 109. Functional components stored in the computer-readable media 112 of the service computing device 102 may include an indexing application 116, a search application 118, and a monitoring application 120 each of which may include one or more computer programs, applications, executable code, or portions thereof. For example, the indexing application 116 may perform a workflow to index system log messages 121 received from the storage system 104 for generating one or more indexes 122, as discussed additionally below. Further, the search application 118 may receive a search query 123 from the client device(s) 108, and in response, may provide a search result response 124. Furthermore, the monitoring application 120 may receive information from the system 100, and may present a monitoring UI 125 on a display 126 for viewing by a user 128.

In addition, functional components stored in the computer-readable media 112 of the service computing device 109 may include a server program 130 and a database program 132, each of which may include one or more computer programs, applications, executable code, or portions thereof. For example, the server program 130 may provide communication functionality with the client device(s) 108 and the storage system 104. The database program 132 may include a database management function for creating and managing a metadata database 133 containing metadata, such as one or more file systems 134 or the like, corresponding to data stored at the storage system 104.

Additional functional components stored in the computer-readable media 112 of the service computing devices 102 and 109 may include an operating system (not shown in FIG. 1) for controlling and managing various functions of the service computing devices 102 and 109. In some cases, the functional components may be stored in a storage portion of the computer-readable media 112, loaded into a local memory portion of the computer-readable media 112, and executed by the one or more processors 110.

In addition, the computer-readable media 112 may store data and data structures used for performing the functions and services described herein. For example, the computer-readable media 112 of the service computing device 102 may store the index(es) 122 as well as API information 135 for one or more application programming interfaces (APIs), as discussed additionally below. Further, the computer-readable media 112 of the service computing device 109 may store the metadata database 133. In the illustrated example, the metadata database 133 includes a plurality of file systems 134. The service computing devices 102 and 109 may also include or maintain other functional components and data, which may include programs, drivers, etc., and the data used or generated by the functional components. Further, the service computing devices 102 and 109 may include many other logical, programmatic, and physical components, of which those described above are merely examples that are related to the discussion herein. Additionally, while the service computing devices 102 and 109 are illustrated as separate computing devices in this example, in other examples, the service computing devices 102 and 109 may be the same computing device.

The communication interface(s) 114 may include one or more interfaces and hardware components for enabling communication with various other devices, such as over the one or more network(s) 105 and 106. Thus, the communication interfaces 114 may include, or may couple to, one or more ports that provide connection to the network(s) 105 for communicating with the storage system 104, and one or more ports that provide connection to the network(s) 106 for communication with the client device(s) 108. For example, the communication interface(s) 114 may enable communication through one or more of a LAN, the Internet, cable networks, cellular networks, wireless networks (e.g., Wi-Fi) and wired networks (e.g., Fibre Channel, fiber optic, Ethernet), direct connections, as well as close-range communications such as BLUETOOTH®, and the like, as additionally enumerated elsewhere herein.

Each client device 108 may be any suitable type of computing device such as a desktop, laptop, tablet computing device, mobile device, smart phone, wearable device, and/or any other type of computing device able to send data over a network. In some cases, the client devices 108 may include a hardware configuration and logical configuration as discussed below with respect to FIG. 6. A client user 136 may be associated with a respective client device 108, such as through a respective user account, user login credentials, or the like. In some examples, the client device(s) 108 may access the service computing devices 102 or 109 via an application server (not shown in FIG. 1), while in other examples, the client device(s) 108 may access the service computing devices 102 and 109 directly. Furthermore, the client devices 108 may be able to communicate with the service computing devices 102 and 109 through the one or more networks 106, through separate networks, or through any other suitable type of communication connection. Numerous other variations will be apparent to those of skill in the art having the benefit of the disclosure herein.

Further, each client device 108 may include a respective instance of a client application 138 that may execute on the respective client device 108, such as for communicating with the server program 130, e.g., for sending user data for storage on the storage system 104 and/or for receiving stored data from the storage system 104. In some cases, the application 138 may include a browser or may operate through a browser, while in other cases, the application 138 may include any other type of application having communication functionality enabling communication with the server program 130 over the one or more networks 106.

The one or more networks 105 and 106 may include any suitable network, including a wide area network, such as the Internet; a local area network (LAN), such as an intranet; a wireless network, such as a cellular network, a local wireless network, such as Wi-Fi, and/or short-range wireless communications, such as BLUETOOTH®; a wired network including Fibre Channel, fiber optics, Ethernet, or any other such network, a direct wired connection, or any combination thereof. Accordingly, the one or more networks 105 and 106 may include both wired and/or wireless communication technologies. Components used for such communications can depend at least in part upon the type of network, the environment selected, or both. Protocols for communicating over such networks are well known and will not be discussed herein in detail. Accordingly, the service computing devices 102 and 109 and client device(s) 108 are able to communicate over the one or more networks 106 using wired or wireless connections, and combinations thereof. Further, in some cases, a load balancing computing device (not shown in FIG. 1) may be located between the service computing devices 102 and/or 109 and the client device(s) 108. Additionally, in some examples, the network 105 may be a LAN, and the service computing devices 102 and 109 may be located locally to the storage system 104.

The storage system 104 may include one or more storage computing devices 140, which may include one or more servers or any other suitable computing device, such as any of the examples discussed above with respect to the service computing devices 102 and 109. The storage computing device(s) 140 may each include one or more processors 142, one or more computer-readable media 144, and one or more communication interfaces 146. For example, the processors 142 may correspond to any of the examples discussed above with respect to the processors 110, the computer-readable media 144 may correspond to any of the examples discussed above with respect to the computer-readable media 112, and the communication interfaces 146 may correspond to any of the examples discussed above with respect to the communication interfaces 114.

In addition, the computer-readable media 144 may include a storage program 148 as a functional component executed by the one or more processors 142 for managing the storage of data on a storage 150 included in the storage system 104. The storage 150 may include one or more controllers 152 associated with the storage 150 for storing data on one or more arrays 154 of storage devices 156. For instance, the controller 152 may control the arrays 154, such as for configuring the arrays 154 in a RAID configuration, or the like, and/or for presenting logical units based on the storage devices 156 to the storage program 148, and for managing data, such as data objects 158, stored on the underlying physical storage devices 156. The storage devices 156 may be any type of storage device, such as hard disk drives, solid state drives, optical drives, magnetic tape, combinations thereof, and so forth. In some examples, the one or more arrays 154 may include a thin-provisioning array configured to provide on-demand storage capacity. Further, the storage 150 may be used to create a storage pool to be used to provide storage capacity for team folders, as well as storage capacity for individual users.

The client user 136 may use the client application 138 executing on the client device 108 to perform client storage operations 160, such as for storing data on the storage system 104, retrieving data from the storage system 104, deleting data from the storage system 104, or the like. To perform such operations, the client application 138 communicates with the server program 130 on the service computing device 109. In turn, depending on the request received from the client application 108, the server program 130 may perform server storage operations 162 with the storage system 104, such as for retrieving user data, storing user data, instructing the storage system 104 to delete user data, or the like.

When the storage computing device 140 performs a storage operation, e.g., in response to a request from the client user 136, the storage computing device 140 may generate a system log 170 that may be stored on the computer-readable media 144 or in another suitable storage location. In addition, the storage program 148 may send information about the system log in a system log message 121 to the service computing device 102. As one example, the system log message 121 may be sent as a syslog formatted message. Syslog is a standard messaging protocol for message logging maintained by the IETF® (Internet Engineering Task Force) that allows separation of the software that generates messages, the system that stores the messages, and the software that reports and analyzes the messages. Alternatively, any of numerous other types of messaging protocols and formats may be used. Accordingly, implementations herein are not limited to use of syslog protocol.

In some cases, the system log messages 121 may correspond to respective actions action performed by the storage system 104, such as access actions e.g., interaction of the client user 136 with a data object 158, such as for writing, reading, moving, deleting, renaming, or the like. In addition, the system log messages may also relate to events performed with respect to the storage system 104, such as actions taken by an administrator through an administrative console (not shown in FIG. 1), such as for changing a setting of the storage system 104, migrating data within the storage system 104, or the like.

The indexing application 116 on the service computing device 102 may receive the system log messages 121 and may apply a workflow, such as for indexing each received system log message 121. Following the completion of the workflow, the monitoring application 120 may present information about the latest system log messages 121 in the monitoring UI 125. In addition, the monitoring application 120 may use the API information 135 to apply one or more APIs for collecting information about the status and performance of the storage system 104 and/or the service computing device(s) 109 or other computing devices in the system 100. For instance, the monitoring application 120 may employ a messaging API (MAPI), a REST API, or various other APIs for gathering information from the system 100 to enable the monitoring application 120 to provide information about status and performance metrics for the system 100 in the UI 125. Furthermore, while APIs are described as one technique for gathering data about the status and performance of the system 100, implementations herein are not limited to the use of APIs or any other particular technique for obtaining information about the status and performance of the components of the system 100. As one example, Simple Object Access Protocol may be used for obtaining or receiving status and performance information.

As discussed above, the indexing workflow performed by the indexing application 116 may fall behind on processing data for the received system log messages 121. For example, the service computing device 102 may have insufficient computing capacity to perform the indexing processing in real time, or the service computing device 102 may receive a large spike of data for processing that the processor(s) 110 may be unable to process in real time or near real time. This delay in processing the data of the received system log messages 121 may cause the monitoring application 120 to be unable to present "up-to-date" data for some visualizations in the UI 125. On the other hand, the API retrieved information 172, or other status and/or performance data received by, or obtained by the monitoring application, may be up-to-date, as no indexing of that information is performed. Furthermore, just knowing that a system log message 121 has not been received for a long time does not provide an indication as to whether the data processed by the indexing application is up to date or otherwise current with the other data.

Accordingly, implementations herein apply techniques for optimally synchronizing the visualizations presented in the UI 125 to avoid continual re-rendering of the data in the UI 125, thereby preventing a flickering of the UI 125 or other undesired effects. Further, the reduction in rendering and re-rendering data improves the operation of the service computing device by making more processing capacity available for performing other operations such as the indexing workflow. Additionally, the techniques herein further provide an indication as to whether the hardware deployed in the service computing device 102 is underpowered, such as in the case that the indexing workflow consistently falls behind in processing the system log messages 121. An example technique for optimizing synchronization of the metric visualizations presented in the UI 125 as discussed below with respect to FIG. 2.

In the illustrated example, the display 126 for presenting the monitoring UI 125 to the user 128 is shown as being connected to the service computing device 102. However, in other examples, the display 126 may be connected to or otherwise associated with one of the client devices 108 and the user 128 may access the monitoring user interface 125 over the one or more networks 106. Accordingly, implementations herein are not limited to the location of the display 126 and/or the user 128.

Figure 2:
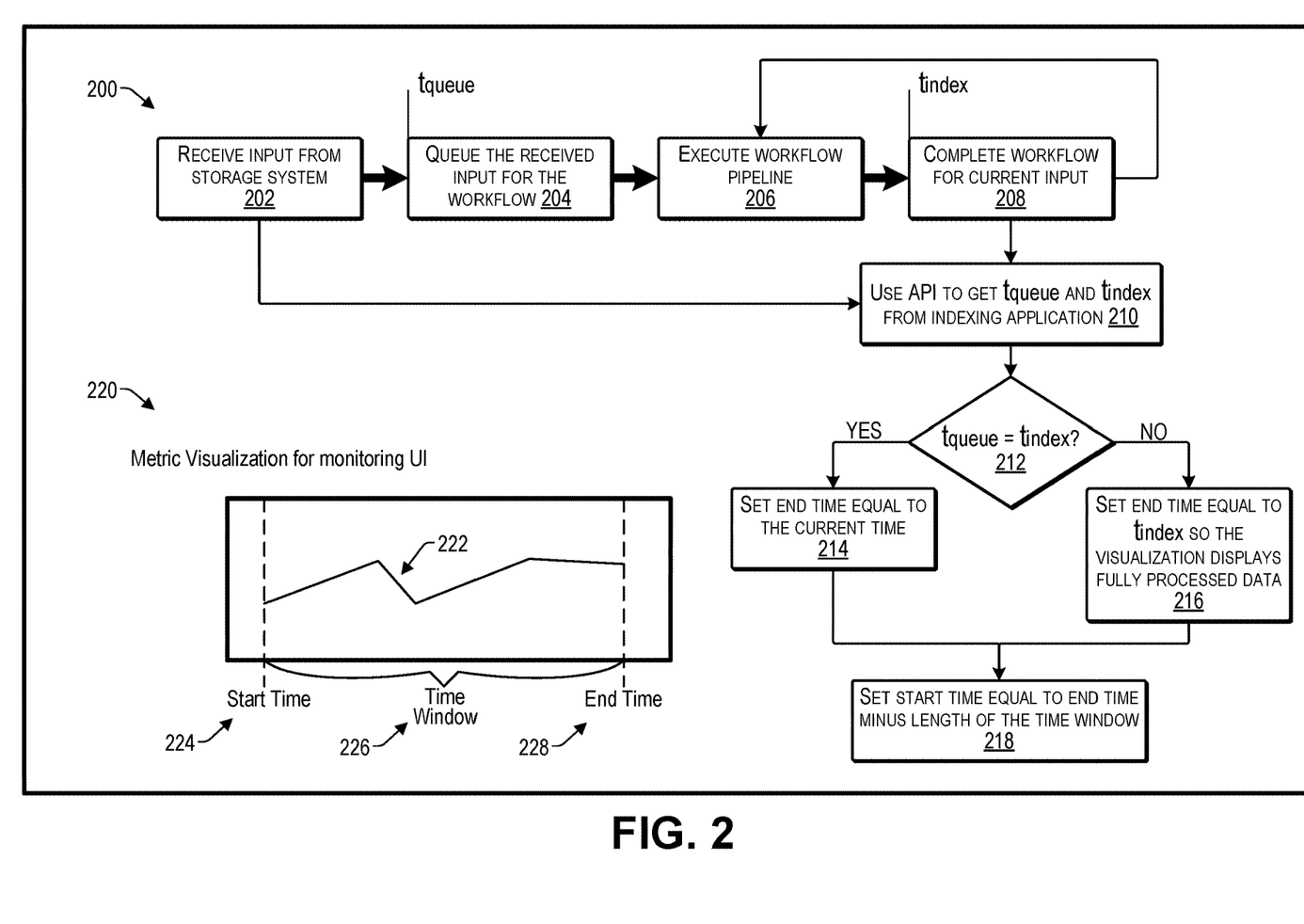
FIG. 2 illustrates flow diagram of an example process and a corresponding metric visualization according to some implementations.
Figure 5:
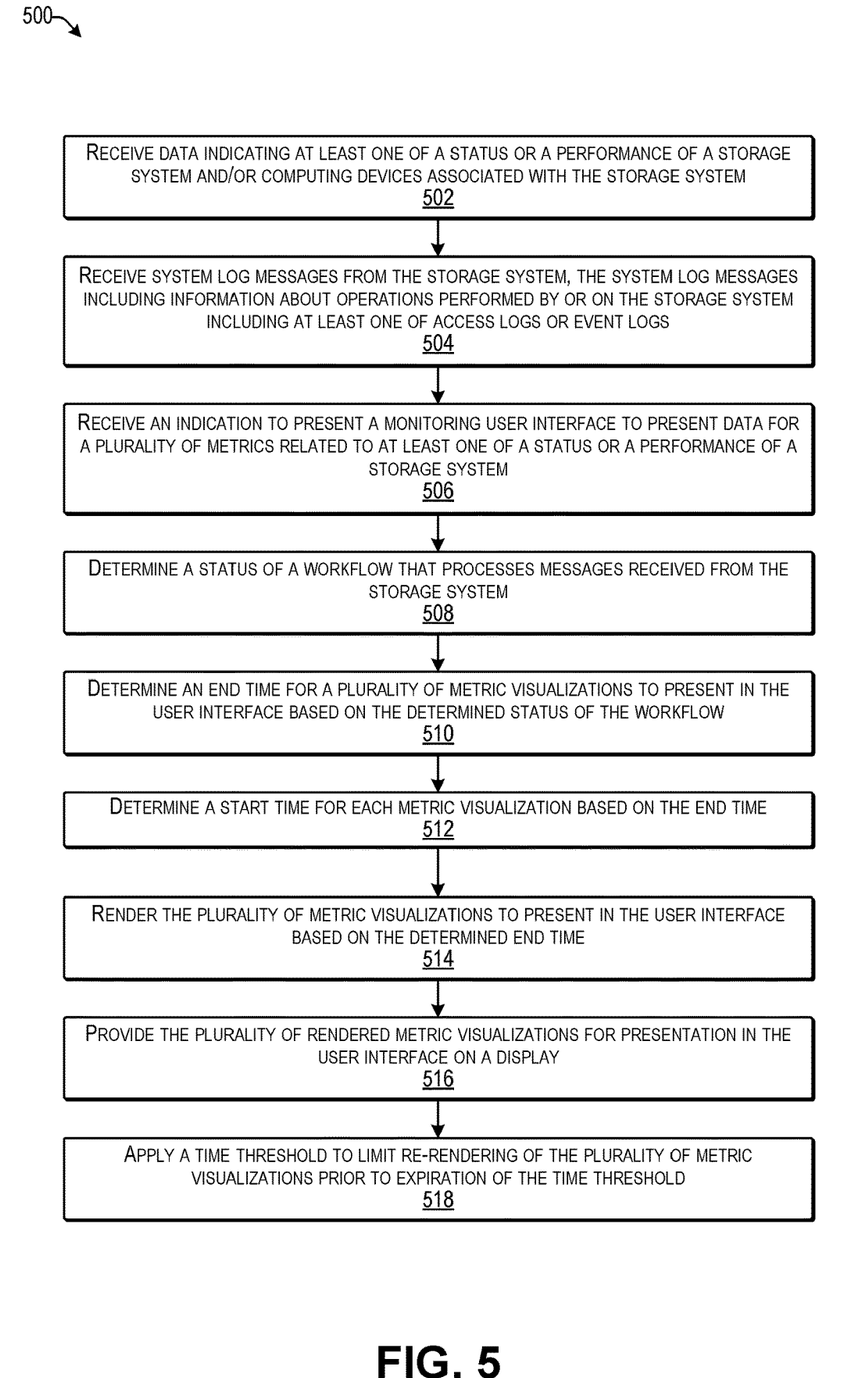
FIG. 5 is a flow diagram illustrating an example process according to some implementations.

FIGS. 2 and 5 include flow diagrams illustrating example processes according to some implementations. The processes are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, frameworks, and systems described in the examples herein, although the processes may be implemented in a wide variety of other environments, frameworks, and systems.

FIG. 2 illustrates an example process 200 and a corresponding metric visualization according to some implementations. The process 200 includes blocks 202-208 which represent a workflow that may be executed by a first application. For example, the workflow of blocks 202-208 may be executed by the indexing application for indexing received system log messages as discussed above, e.g., with respect to FIG. 1. The process 200 further includes blocks 210-218, which represent operations performed by the monitoring application for determining an optimal metric visualization to present in the monitoring UI based on the status of the workflow of the block 202-208.

At 202, the computing device may receive input from the storage system. For example, the storage device may send system log messages to the computing device as operations are performed on the storage system. The indexing application on the computing device may receive the system log messages, and may perform a workflow for processing the received messages. In the illustrated example, the workflow includes indexing of the received messages such as by extracting text, metadata, and other information contained in these message four perform in an indexing function for the object data stored on the storage system 104. As mentioned above, the types of system log messages may include access logs and event logs. The access logs may include actions performed by users with respect to object data stored in the storage system, e.g., reading, writing, deleting, migrating, renaming, and so forth. Event logs may include administrative actions, such as may be performed through an administrative console, and may include migrating data, changing storage system settings, and so forth.

At 204, the computing device may queue the received input for processing the received input in the workflow. For example, the computing device may have a first-in-first-out queue for the workflow for performing the workflow processing. Each input in the queue may have a timestamp associated with it. For instance, each received system log message may have a timestamp assigned by the storage system that sent the system log message and that may correspond to a time at which the corresponding operation took place on the storage system.

At 206, the computing device may execute the workflow pipeline with respect to the received input. For example, in the case that the workflow is for indexing a received system log message, the workflow may include indexing operations such as parsing the received message and extracting the relevant information for indexing, including determining the action performed, determining a latency in performing the operation on the storage system, determining a namespace related to the operation, detecting MIME types of documents, extracting text and metadata, as well as extracting other information that may be used for indexing, depending on the nature of the data object to which the system log message pertains.

At 208, the workflow is completed for the current input, and the indexing application may return to block 206 to check for and perform workflow processing for any additional inputs in the queue waiting for workflow processing. The indexing application may extract the timestamp of each system log message that has been indexed and, thus, may access the timestamp of the most recently indexed system log message, which corresponds to $t_{index}$ in this example.

At 210, the monitoring application executing on the computing device may use an internal API or other intra-application communication to get $t_{queue}$ and $t_{index}$ from the indexing application. The timestamps of each system log message may be determined by the monitoring program from the indexing program using the internal API to obtain the timestamp of the most-recently queued system log message as tqueue (i.e., the last system log message that was placed into the queue) and the timestamp of the most-recently indexed system log message, i.e., $t_{index}$.

At 212, the monitoring program on the computing device may compare $t_{queue}$ with $t_{index}$ to determine if they are the same. For example, when generating a monitoring UI as discussed above with respect to FIG. 1, and as discussed additionally below with respect to FIG. 3, the monitoring program may optimize the metrics presented in the monitoring UI to ensure that the end times for each metric match each other. Consequently, the monitoring program first determines if the workflow is up-to-date by comparing the timestamp $t_{queue}$ of the last system log message added to the queue with the timestamp $t_{index}$ contained in the most recently indexed system log message.

At 214, when $t_{queue}$ is equal to $t_{index}$, then the workflow is up-to-date, and the end time for the metrics to be presented in the monitoring UI may be set to the current time. For example, as illustrated at 220, an example metric visualization for the monitoring UI may include data 222, which may be represented graphically or otherwise, a start time 224, a time window 226, and an end time 228. The time window 226 is equal to the difference between the end time and the start time, and, in some cases, may be the same for all the visualizations to be presented in the monitoring UI. Furthermore, for optimizing the monitoring UI to prevent continual re-rendering of the monitoring UI as additional inputs are processed through the workflow, all the metric visualization presented in the monitoring UI may be rendered based on the current time, and the next time for re-rendering of the monitoring UI may be limited to a threshold time (e.g., specified by default or by the user) and/or may be limited to receiving a manual input from the user that causes re-rendering, or the like. Accordingly, when the workflow is up-to-date, all of the visualizations may display data received up to the current time, assuming there are no other workflows that may cause delay in processing some of the received data.

At 216, when $t_{queue}$ is not equal to $t_{index}$, then the workflow is behind in processing information. Accordingly, the monitoring program may set the end time for the metric visualization to $t_{index}$, which corresponds to the timestamp of the most recently indexed system log message. For example, the monitoring program determines the latest point in time for which all data up to that point in time has been indexed. All of the metric visualizations for presentation in the monitoring UI may then be configured to display data 222 can then display up until that point in time to which the system log messages have been indexed. Accordingly, by using this technique, all of the metric visualizations presented in the monitoring UI appear to be in synchronization on the presented monitoring UI. Accordingly, because all of the received system log messages that are processed by the workflow include their individual timestamp of when the operation occurred on the source system, the timestamps associated with individual messages may be used for determining whether the workflow is up-to-date or behind in processing. Consequently, when rendering the monitoring UI, the monitoring program limits the data rendered in each metric visualization to the time corresponding to the $t_{index}$, i.e., the timestamp of the most recently indexed system log message At 218, the monitoring program sets the start time for each metric visualization equal to the end time minus the length of the time window for each metric visualization to be presented in the monitoring UI. As mentioned above, the end time for each metric visualization is determined in block 214 or 216. Typically, the time window may be the same for all the visualizations presented in the monitoring UI at a particular time; however, in other examples, different time windows having different lengths of time may be employed. The monitoring program may then render a plurality of the metric visualizations on the display, and all of the metric visualization will display data up to the determined end point, thereby allowing for the visualizations within the presented monitoring UI to align with each other. Accordingly, implementations herein provide a monitoring UI that avoids confusion to a user. For example, in the case that the time window is equal to one hour, then all the metric visualizations on the monitoring UI are aligned to the same one-hour window, i.e., the same start time and same end time. If $t_{queue}$ equals $t_{index}$, then the end time is set to the actual time. If $t_{queue}$ is not equal to $t_{index}$, then the end time is set to the $t_{index}$ time, i.e., corresponding to the timestamp of the most recently indexed system log message. Further the monitoring application may limit the re-rendering of the monitoring UI to a threshold time limit, e.g., every 30 seconds, every minute, every two minutes, every five minutes, etc., to avoid continual re-rendering of the monitoring UI as additional system log messages are processed by the workflow.

Figure 3:
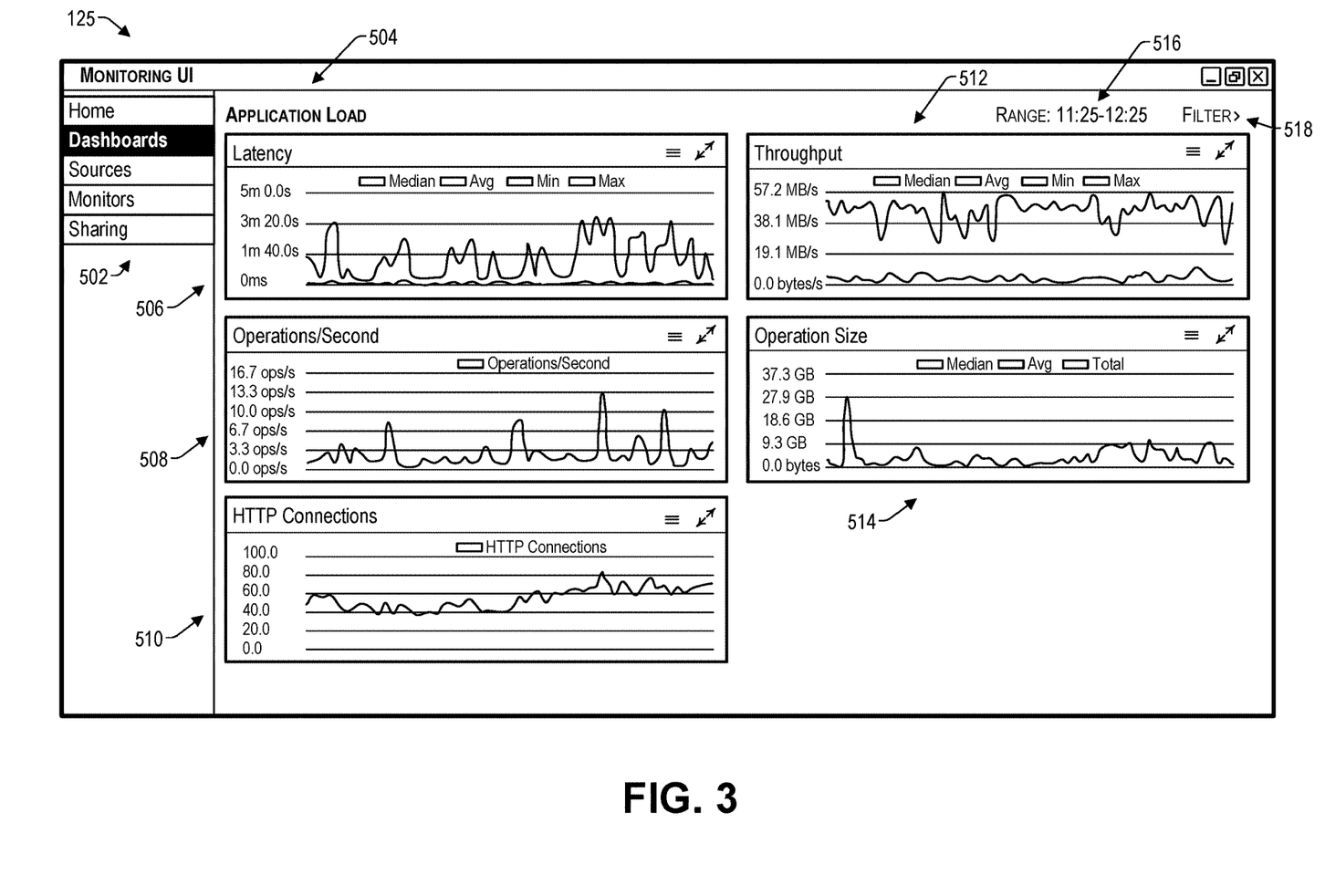
FIG. 3 illustrates an example monitoring user interface according to some implementations.

FIG. 3 illustrates an example configuration of the monitoring UI 125 according to some implementations. The example configuration illustrated in FIG. 3 includes five different metric visualizations; however implementations herein may include more or less metric visualizations, and may include a large variety of other metric visualizations for other metrics. In some cases, the user interface 125 may be presented on a display accessible to an administrative user, or on display of a computing device of another user having sufficient permission status for viewing the status and performance of the system 100 discussed above.

In the illustrated example, the monitoring UI includes a menu 502, which indicates that the user has selected to view the monitoring dashboards corresponding to the monitoring UI 125. The menu 502 may further enable the user to select the sources of the metrics to present, monitoring settings, sharing settings, or a return to a home screen. Further in this example, the selected monitoring UI may represent an application load monitoring UI, as indicated at 504. In the illustrated example, the metric visualizations included in the monitoring UI 125 include storage system latency 506, storage system operations per second 508, number of storage system HTTP connections 510, storage system throughput 512, and storage system operation size 514.

Examples of other types of monitoring UIs not illustrated herein may include a resources monitoring UI, a storage and objects monitoring UI, and an application breakdown monitoring UI. For example, the resources monitoring UI may include metric visualizations for CPU utilization, CPU input/output wait time, disk input/output time, disk utilization, HTTP connections, front end network input/output, and back end network input/output. The storage and objects monitoring UI may include metric visualizations for primary storage utilization, economy storage utilization, number of objects in storage, storage by node, storage by tenant, and number of objects by tenant (i.e., a user of the storage system). Additionally, the application breakdown monitoring UI may include metric visualizations for operations per second by node, operations per second by tenant, operations per second by type, operations per second by response, and operations per second by gateway. Furthermore, users may be able to specify custom monitoring UIs that may include selected metric visualizations specified by the user, such as any of those metric visualizations discussed above or other metric visualizations.

In the illustrated example, as indicated at 516, the range of the rendered metric visualizations 506-514 may be indicated, e.g., 11:25-12:25 in this example. Further, as indicated at 518, the user may select a filter control for controlling the time window or other settings for the monitoring UI. Additionally, while one example of a monitoring UI is described and illustrated herein, numerous other variations will be apparent to those of skill in the art having the benefit of the disclosure herein.

Figure 4:
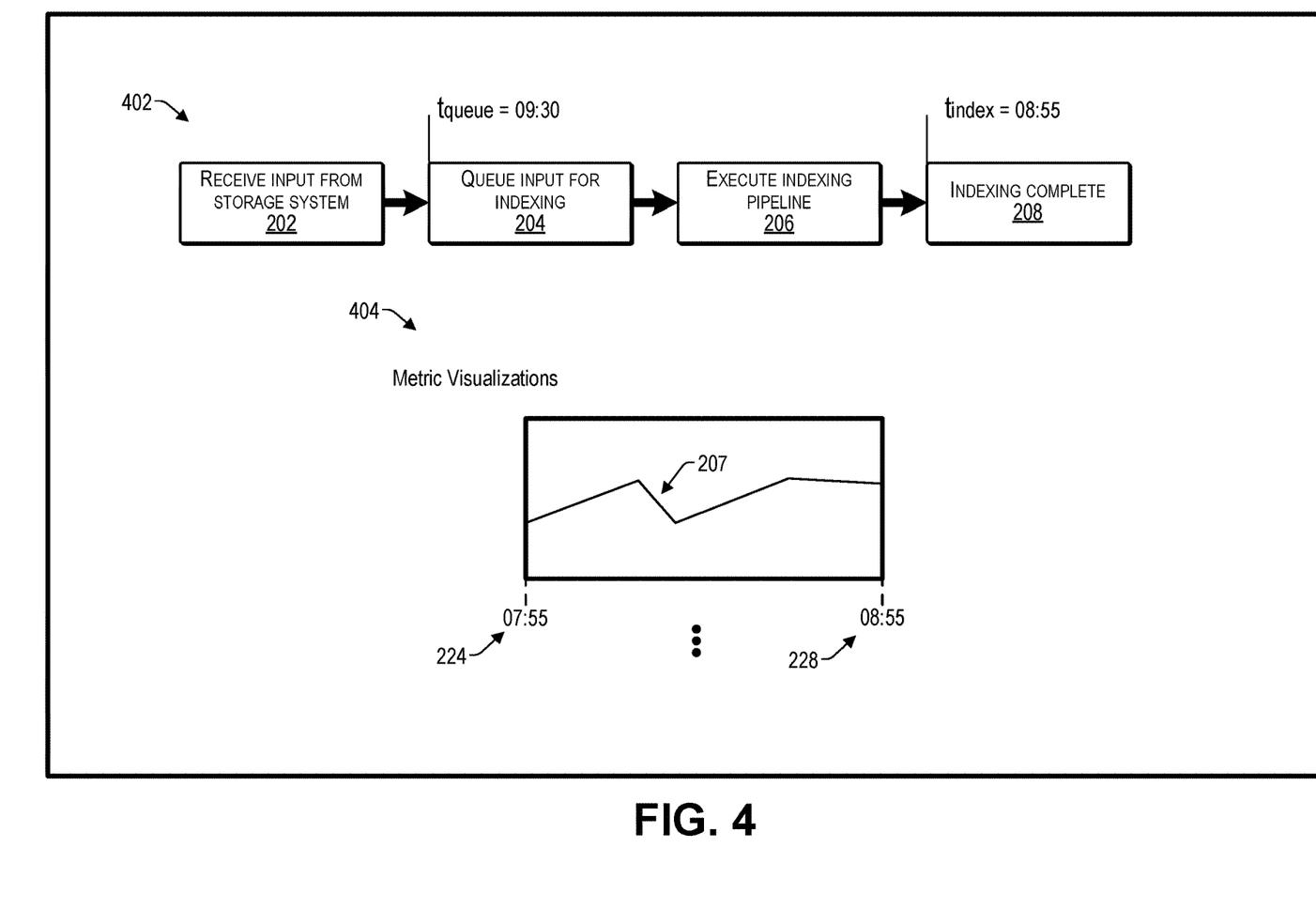
FIG. 4 illustrates an example of determining end times for metric visualizations according to some implementations.

FIG. 4 illustrates an example of determining an end time and start time according to some implementations. In this example, as discussed above with respect to FIG. 2, suppose that the monitoring program has received a request from the user to present the monitoring on UI on a display. Accordingly, prior to rendering the monitoring UI, the monitoring program determines the end time to use for the metric visualizations to be presented in the monitoring UI. Accordingly, in this example suppose that the monitoring program determines $t_{queue}$ and $t_{index}$ from the current workflow 402. In this example, suppose that the monitoring program determines that the timestamp of the message corresponding to $t_{queue}$ is equal to 9:30 AM and that the timestamp $t_{index}$ of the message corresponding to is equal to 8:55 AM. Consequently, because $t_{queue}$ is not equal to $t_{index}$, then for each metric visualization 404 to be rendered, the monitoring program sets the end time 228 to be equal to the timestamp of the message corresponding to $t_{index}$, i.e., 8:55 AM in this example. Furthermore, when all the metric visualizations 404 are to be presented for the same time window, the monitoring program may set the start time 224 to be equal to the end time minus the length of the time window, which in this example is one hour, and therefore the start time is set to be equal to 7:55 AM. Accordingly, the monitoring program may render the monitoring UI with a plurality of the metric visualizations 404 having the same start times 224 and end times 228.

FIG. 5 is a flow diagram illustrating an example process 500 according to some implementations. In some cases, the process 500 may be executed at least in part by the service computing device(s) 102 or other suitable computing device. As one example, the monitoring application 120 executed by the one of more processors of the service computing device(s) 102 discussed above with respect to FIGS. 1-4 may include executable instructions for performing at least part of the process 500 of FIG. 5.

At 502, the computing device may receive data indicating at least one of a status or a performance of a storage system and/or computing devices associated with the storage. In some cases an API or other techniques may be used to gather data from the storage system, other nodes, or the like.

At 504, the computing device may receive system log messages from the storage system, the system log messages including information about operations performed by or on the storage system including at least one of access logs or event logs. For instance, the computing device may receive syslog messages or other messages from the storage system including information about operations performed on the storage system.

At 506, the computing device may receive an indication to present a monitoring user interface to present data for a plurality of metrics related to at least one of a status or a performance of a storage system. As one example, a user may input a command to cause the monitoring application to present the monitoring UI on a display associated with the computing device or on another computing device in communication with the computing device.

At 508, the computing device may determine a status of a workflow that processes messages received from the storage system. For example, the status of the workflow may be determined as discussed below with respect to block 210 of FIG. 2.

At 510, the computing device may determine an end time for a plurality of metric visualizations to present in the user interface based on the determined status of the workflow. For example, the end time to use may be determined as discussed below with respect to blocks 212-216 of FIG. 2.

At 512, the computing device may determine a start time for each metric visualization based on the end time. For example, the start time may be determined as discussed below with respect to block 218 of FIG. 2.

At 514, the computing device may render the plurality of metric visualizations to present in the user interface based on the determined end time. The computing device may use any of various known rendering techniques for rending the metric visualizations for presentation in the monitoring UI>

At 516, the computing device may provide the plurality of rendered metric visualizations for presentation in the user interface on a display. In some cases, the rendered metric visualizations may be provided to a display controller for presentation in the monitoring UI on the display. In other examples, the rendered metric visualizations (or information to enable remote rendering) are sent over a network to a client computing device.

At 518, the computing device may apply a time threshold to limit re-rendering of the plurality of metric visualizations prior to expiration of the time threshold. In some cases, the monitoring program may periodically check the status of the workflow, and may update the rendered metric visualizations if there has been new data received and a threshold time has expired.

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, the implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art.

Figure 6:
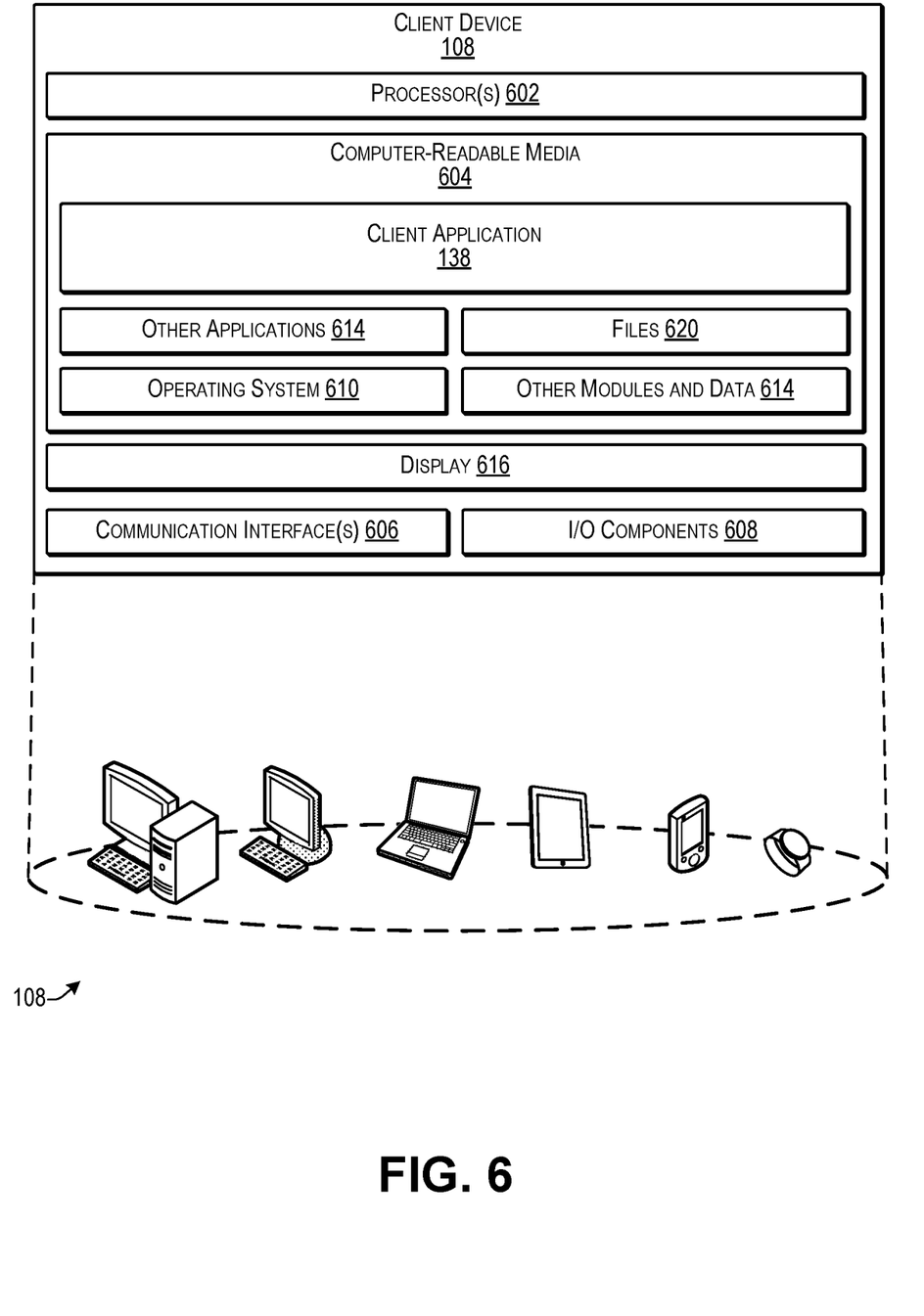
FIG. 6 illustrates an example configuration of a client device according to some implementations.

FIG. 6 illustrates select example components of an example client device 108 according to some implementations. Each client device 108 may be any suitable type of computing device such as a workstation, desktop, laptop, tablet computing device, mobile device, smart phone, wearable computing device, or any other type of computing device able to send and receive data over a network. Furthermore, the client devices 108 may be able to communicate with the one or more service computing devices 102 through the one or more networks 106, through separate networks, or through any other suitable type of communication connection (not shown in FIG. 6). Numerous other variations may be apparent to those of skill in the art having the benefit of the disclosure herein.

In a basic configuration, the client device 108 includes components such as at least one processor 602, one or more computer-readable media 604, one or more communication interfaces 606, and one or more input/output (I/O) components 608. Each processor 602 may itself comprise one or more processors or processing cores. For example, each processor 602 may be implemented as one or more microprocessors, microcomputers, microcontrollers, digital signal processors, central processing units, state machines, logic circuitries, and/or any devices that manipulate signals based on operational instructions. In some cases, the processor 602 may include one or more hardware processors and/or logic circuits of any suitable type specifically programmed or configured to execute the processes and other algorithms described herein. The processor 602 may be configured to fetch and execute computer-readable processor-executable instructions stored in the computer-readable media 604.

Depending on the configuration of the client device 108, the computer-readable media 604 may be an example of tangible non-transitory computer-readable media and may include volatile and nonvolatile memory and/or removable and non-removable media implemented in any type of technology for storage of information such as computer-readable processor-executable instructions, data structures, program modules, or other data. The computer-readable media 604 may include, but is not limited to, RAM, ROM, EEPROM, flash memory, solid-state storage, optical storage, magnetic disk storage, magnetic tape, and/or other types of storage technology. Further, in some cases, the client device 108 may access external storage, such as directly, through another computing device, or through a network. Accordingly, the computer-readable media 604 may be computer storage media able to store instructions, programs, or software code that may be executed by the processor 602.

The computer-readable media 604 may be used to store and maintain any number of functional components that are executable by the processor 602. In some implementations, these functional components comprise instructions or programs that are executable by the processor 602 and that, when executed, implement operational logic for performing the actions and services attributed above to the client devices 108. Functional components of the client device 108 stored in the computer-readable media 604 may include the client application 138, as discussed above. Additional functional components may include an operating system 610 for controlling and managing various functions of the client device 108 and for enabling basic user interactions with the client device 108. The computer-readable media 604 may further include one or more other applications 614 that may be executed on the client devices 108 for performing various functions and tasks, which may include a browser application. Additionally, or alternatively, in some cases, the client application 138 may be or may include a browser.

In addition, the computer-readable media 604 may also store data, data structures and the like, that are used by the functional components. For example, data and data structures stored by the computer-readable media 604 may include one or more files 612 and/or other data objects. Depending on the type of the client device 108, the computer-readable media 604 may also optionally include other functional components and data, such as other modules and data 614, which may include programs, drivers, etc., and the data used or generated by the functional components. Further, the client device 108 may include many other logical, programmatic, and physical components, of which those described are merely examples that are related to the discussion herein.

The client device 108 may further include the one or more communication interfaces 606. The communication interface(s) 606 may include one or more interfaces and hardware components for enabling communication with various other devices, such as over the network(s) 105 and 106. For example, the communication interfaces 606 may include, or may couple to, one or more ports that provide connection to the network(s) 106 for communication with the service computing devices 102 or other computing devices. For example, the communication interface(s) 606 may enable communication through one or more of a LAN (local area network), WAN (wide area network), the Internet, cable networks, cellular networks, wireless networks (e.g., Wi-Fi) and wired networks (e.g., Fibre Channel, fiber optic, Ethernet), direct connections, as well as close-range communications such as BLUETOOTH®, and the like, as additionally enumerated elsewhere herein.

The client device 108 may further include the I/O components 608, such as speakers, a microphone, a camera, and various user controls (e.g., buttons, a joystick, a keyboard, a keypad, a touch screen, etc.), a haptic output device, and so forth. For example, the operating system 610 of the client device 108 may include suitable drivers configured to accept input from a keypad, keyboard, or other user controls and devices included with the I/O components 608. In addition, the client device 108 may include a display 616. Additionally, the client device 108 may include various other components that are not shown, examples of which include various types of sensors, a Global Positioning System device, a power source, such as a battery and power control unit, and so forth.

Various instructions, processes, and techniques described herein may be considered in the general context of computer-executable instructions, such as program modules stored on computer-readable media, and executed by the processor(s) herein. Generally, program modules include routines, programs, objects, components, data structures, executable code, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The invention claimed is:

1. A system comprising:
one or more processors; and
one or more non-transitory computer-readable media maintaining executable instructions, which, when executed by the one or more processors, configure the one or more processors to perform operations comprising:
receiving an indication to present a user interface presenting data for a plurality of metrics related to at least one of a status or a performance of a storage system;
receiving information related to a workflow that processes messages received from the storage system, wherein the workflow includes a queue for queuing received messages prior to processing of the messages by the workflow, the received information including a first timestamp of a message most recently added to the queue and a second timestamp of a message for which the workflow was most recently completed;
comparing the first timestamp of the message most recently added to the queue with the second timestamp of the message for which the workflow was most recently completed;
based on determining that the first timestamp of the message most recently added to the queue does not match the second timestamp of the message for which the workflow was most recently completed,
setting an end time for a plurality of metric visualizations to present in the user interface based on the second timestamp;
rendering the plurality of metric visualizations, each metric visualization having the determined end time; and
providing the plurality of rendered metric visualizations for presentation in the user interface on a display.

2. The system as recited in claim 1, the operations further comprising:
receiving subsequent information related to the status of the workflow, the received subsequent information including a third timestamp of a message most recently added to the queue, and a fourth timestamp of a message for which the workflow was most recently completed; and
based on the third timestamp matching the fourth timestamp, setting the end time for the plurality of metric visualizations to a current time.

3. The system as recited in claim 1, wherein determining that the first timestamp does not match the second timestamp indicates that the workflow is behind in processing messages in the queue.

4. The system as recited in claim 1, wherein:
the workflow comprises an indexing process for indexing the received messages; and
receiving information related to the workflow comprises communicating with the indexing process to determine the first timestamp and the second timestamp.

5. The system as recited in claim 4, wherein communicating with the indexing process to determine the first timestamp and the second timestamp comprises a monitoring application executing on the one or more processors employing an application programming interface to obtain the first timestamp and the second time stamp from the indexing process.

6. The system as recited in claim 1, further comprising determining a start time for each of the plurality of metric visualizations to present in the user interface, wherein the start time is determined by subtracting a respective time window for a respective metric visualization from the end time for each respective metric visualization.

7. The system as recited in claim 1, wherein the messages are system log messages including information about operations performed by or on the storage system including at least one of access logs or event logs, wherein the access logs include information related to actions performed by users with respect to object data stored by the storage system, and the event logs include information related to administrative actions.

8. The system as recited in claim 1, wherein the data for a plurality of metrics includes data obtained via one or more application programming interfaces from the storage system or one or more computing devices that interact with the storage system.

9. The system as recited in claim 1, wherein:
the user interface including the rendered metric visualizations is presented on a display; and
a time threshold is applied to limit re-rendering of the rendered metric visualizations before expiration of the time threshold, wherein the time threshold for limiting re-rendering is specified by a user.

10. A method comprising:
receiving, by one or more processors, an indication to present a user interface presenting data for a plurality of metrics related to at least one of a status or a performance of a storage system;

receiving information related to a workflow that processes messages received from the storage system, wherein the workflow includes a queue for queuing received messages prior to processing of the messages by the workflow, the received information including a first timestamp of a message most recently added to the queue and a second timestamp of a message for which the workflow was most recently completed;

comparing the first timestamp of the message most recently added to the queue with the second timestamp of the message for which the workflow was most recently completed;

based on determining that the first timestamp of the message most recently added to the queue does not match the second timestamp of the message for which the workflow was most recently completed, setting an end time for a plurality of metric visualizations to present in the user interface based on the second timestamp;

rendering the plurality of metric visualizations, each metric visualization having the determined end time; and providing the plurality of rendered metric visualizations for presentation in the user interface on a display.

11. The method as recited in claim 10, wherein determining that the first timestamp does not match the second timestamp indicates that the workflow is behind in processing messages in the queue.

12. The method as recited in claim 11, further comprising:

receiving subsequent information related to the status of the workflow, the received subsequent information including a third timestamp of a message most recently added to the queue, and a fourth timestamp of a message for which the workflow was most recently completed; and based on determining that the third timestamp matches the fourth timestamp, setting the end time for the plurality of metric visualizations to a current time.

13. One or more non-transitory computer-readable media storing instructions that, when executed by one or more processors, program the one or more processors to perform operations comprising:

receiving an indication to present a user interface presenting data for a plurality of metrics related to at least one of a status or a performance of a storage system;

receiving information related to a workflow that processes messages received from the storage system, wherein the workflow includes a queue for queuing received messages prior to processing of the messages by the workflow, the received information including a first timestamp of a message most recently added to the queue and a second timestamp of a message for which the workflow was most recently completed;

comparing the first timestamp of the message most recently added to the queue with the second timestamp of the message for which the workflow was most recently completed;

based on determining that the first timestamp of the message most recently added to the queue does not match the second timestamp of the message for which the workflow was most recently completed, setting an end time for a plurality of metric visualizations to present in the user interface based on the second timestamp;

rendering the plurality of metric visualizations, each metric visualization having the determined end time; and providing the plurality of rendered metric visualizations for presentation in the user interface on a display.

14. The one or more computer-readable media as recited in claim 13, wherein determining that the first timestamp does not match the second timestamp indicates that the workflow is behind in processing messages in the queue.

15. The one or more computer-readable media as recited in claim 13, the operations further comprising:

receiving subsequent information related to the status of the workflow, the received subsequent information including a third timestamp of a message most recently added to the queue, and a fourth timestamp of a message for which the workflow was most recently completed; and based on determining that the third timestamp matches the fourth timestamp, setting the end time for the plurality of metric visualizations to a current time.

16. The one or more computer-readable media as recited in claim 13, wherein:

the workflow comprises an indexing process for indexing the received messages; and receiving information related to the workflow comprises communicating with the indexing process to determine the first timestamp and the second timestamp.

17. The one or more computer-readable media as recited in claim 16, wherein communicating with the indexing process to determine the first timestamp and the second timestamp comprises a monitoring application executing on the one or more processors employing an application programming interface to obtain the first timestamp and the second time stamp from the indexing process.

18. The one or more computer-readable media as recited in claim 13, further comprising determining a start time for each of the plurality of metric visualizations to present in the user interface, wherein the start time is determined by subtracting a respective time window for a respective metric visualization from the end time for each respective metric visualization.

19. The one or more computer-readable media as recited in claim 13, wherein:

the user interface including the rendered metric visualizations is presented on a display; and a time threshold is applied to limit re-rendering of the rendered metric visualizations before expiration of the time threshold, wherein the time threshold for limiting re-rendering is specified by a user.

\* \* \* \* \*